United States Patent
Hoffman et al.

(10) Patent No.: US 10,232,459 B2
(45) Date of Patent: Mar. 19, 2019

(54) DISPLACEMENT WELDING CHAMBER

(71) Applicant: Hydra Heating Industries, LLC, Atlanta, GA (US)

(72) Inventors: Michael Hoffman, Atlanta, GA (US); Shuping Wang, Richmond, CA (US); Chris Endres, Urbana, IL (US)

(73) Assignee: Hydra Heating Industries, LLC, Atlanta, GA (US)

(*) Notice: Subject to any disclaimer, the term of this patent is extended or adjusted under 35 U.S.C. 154(b) by 0 days.

(21) Appl. No.: 15/424,049

(22) Filed: Feb. 3, 2017

(65) Prior Publication Data

US 2018/0147650 A1 May 31, 2018

Related U.S. Application Data

(60) Provisional application No. 62/426,589, filed on Nov. 27, 2016.

(51) Int. Cl.
| | |
|---|---|
| *B23K 9/00* | (2006.01) |
| *B23K 35/00* | (2006.01) |
| *B23K 9/32* | (2006.01) |
| *B23K 37/04* | (2006.01) |
| *B23K 35/38* | (2006.01) |
| *B23K 9/16* | (2006.01) |

(52) U.S. Cl.
CPC ............. *B23K 9/325* (2013.01); *B23K 9/16* (2013.01); *B23K 35/38* (2013.01); *B23K 37/04* (2013.01)

(58) Field of Classification Search
CPC ................. B23K 9/325; B23K 37/04; B23K 9/16–9/1735
USPC ................................ 228/42, 219–220
See application file for complete search history.

(56) References Cited

U.S. PATENT DOCUMENTS

| | | | | |
|---|---|---|---|---|
| 2,045,802 A | * | 6/1936 | Richter | A61F 9/06 2/8.2 |
| 2,590,577 A | * | 3/1952 | Ruemelin | B23K 9/32 312/280 |
| 3,020,389 A | * | 2/1962 | Gorman | B01L 1/02 219/121.13 |
| 3,433,923 A | * | 3/1969 | Mcnabb | B23K 15/06 219/121.13 |
| 3,485,998 A | * | 12/1969 | Gerard | B23K 15/06 219/121.11 |
| 3,581,042 A | * | 5/1971 | Pilia | B23K 9/0061 219/61 |
| 4,437,710 A | * | 3/1984 | MacFarland | B23K 9/325 219/74 |
| 4,686,341 A | * | 8/1987 | Nomura | B23K 9/325 219/53 |

(Continued)

FOREIGN PATENT DOCUMENTS

| | | | | |
|---|---|---|---|---|
| JP | 60083788 A | * | 5/1985 | B23K 15/00 |
| JP | 60096380 A | * | 5/1985 | B23K 15/00 |
| JP | 06071484 A | * | 3/1994 | |

*Primary Examiner* — Kiley S Stoner
(74) *Attorney, Agent, or Firm* — Thomas Horstemeyer, LLP

(57) ABSTRACT

Various welding chambers are disclosed herein. A welding chamber body has a glove tube attached to its sidewall. A windowed hood structure is attached to the welding chamber body using a hinge assembly. A manifold assembly has a main branch and perforated secondary branches. A cross sectional area of the main branch is greater than a second cross sectional area of one of the secondary branches.

20 Claims, 8 Drawing Sheets

(56) References Cited

U.S. PATENT DOCUMENTS

| | | | | | |
|---|---|---|---|---|---|
| 5,170,027 | A | * | 12/1992 | Brodersen | B23K 9/325 219/136 |
| 5,410,120 | A | * | 4/1995 | Taylor | B23K 9/325 219/137 R |
| 5,685,771 | A | * | 11/1997 | Kleppen | B08B 15/026 219/72 |
| 5,811,055 | A | * | 9/1998 | Geiger | B23K 9/0061 266/48 |
| 6,330,966 | B1 | * | 12/2001 | Eissfeller | B23K 37/0235 219/125.1 |
| 6,583,387 | B2 | * | 6/2003 | Kelly | B23K 9/16 219/137 R |
| 7,129,436 | B1 | * | 10/2006 | Corne | B23K 20/233 219/72 |
| 2005/0029241 | A1 | * | 2/2005 | Miao Spear | B23K 9/10 219/130.1 |
| 2006/0261715 | A1 | * | 11/2006 | Bender | B23K 9/32 312/328 |
| 2008/0116245 | A1 | * | 5/2008 | Garza | B23K 28/003 228/18 |
| 2009/0026173 | A1 | * | 1/2009 | Arnett | B08B 15/02 219/74 |
| 2010/0258546 | A1 | * | 10/2010 | Sithes | B23K 9/324 219/136 |
| 2011/0089225 | A1 | * | 4/2011 | Patrick | B23K 9/325 228/221 |
| 2011/0192569 | A1 | * | 8/2011 | McKinley | B23K 37/003 165/67 |
| 2012/0270489 | A1 | * | 10/2012 | Sithes | B23K 9/324 454/66 |
| 2015/0359678 | A1 | * | 12/2015 | Terranova | A61F 9/061 2/8.3 |

\* cited by examiner

DISPLACEMENT WELDING CHAMBER

CROSS-REFERENCE TO RELATED APPLICATIONS

This application claims the benefit of U.S. Provisional Application No. 62/426,589, filed Nov. 27, 2016, the entire contents of which are hereby incorporated herein by reference.

BACKGROUND

Welding of stainless steel, titanium, nickel, zirconium, and other nonferrous metals can benefit from a proper weld environment. Equipment that provides an inert gas environment can have a major impact on preventing oxidation and improving final weld quality. For example, an inert gas atmosphere can be used for precision welding of reactive metals and non-reactive metals.

BRIEF DESCRIPTION OF THE DRAWINGS

Aspects of the present disclosure can be better understood with reference to the following drawings. It is noted that the elements in the drawings are not necessarily to scale, with emphasis instead being placed upon clearly illustrating the principles of the embodiments. In the drawings, like reference numerals designate like or corresponding, but not necessarily the same, elements throughout the several views.

DETAILED DESCRIPTION

Figure 1A:
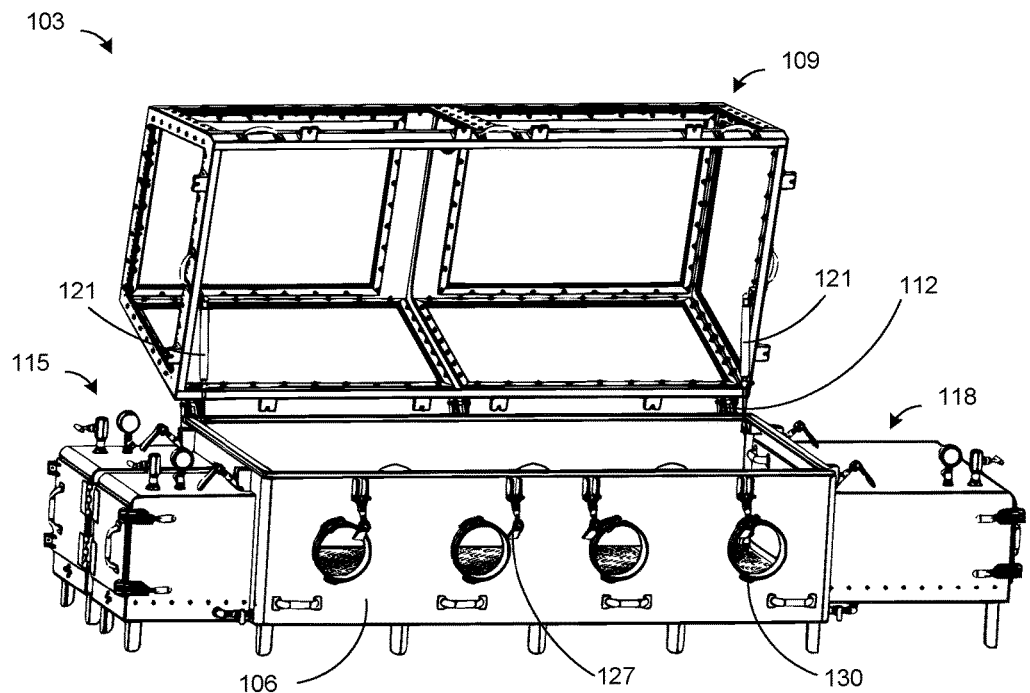
FIGS. 1A-1C illustrate perspective views of an example of a displacement welding chamber according to an embodiment.

Traditional systems and methods for welding stainless steel, titanium, nickel, zirconium, and other nonferrous metals can be wasteful and expensive, or insubstantial. For example, solid vacuum chambers that remove all or most existing gas and replace with an inert gas must withstand a vacuum pressure sufficient to remove existing gas from the chamber, or hold a pressure significantly lower than the area outside the chamber. Inflatable purge chambers and vacuum chambers can feel insubstantial and fragile as a welding environment. Some purge chambers wastefully cause inert gas introduced to such a chamber to readily mix with or disperse into existing gas, causing a wasteful purge of the introduced gas along with the existing gas. While some mixing or dispersion of introduced gas is unavoidable, the present disclosure relates to providing systems and methods that provide a displacement welding chamber that minimizes such mixing or dilution, displacing the existing gas with an inert gas such as argon, promoting a smooth introduction of argon and a corresponding expulsion of existing gas.

In various embodiments, a welding chamber can include a body structure with sidewalls, a bottom, a glove tube, and a glove hole that extends through the glove tube and the first one of the sidewalls. A glove can be attached to the glove tube using clamping rings.

In various embodiments, a hood structure can be attached to the body structure using a hinge assembly. The hood structure can have a number of windows. In various embodiments, an ultraviolet (UV) protective film can be applied to an inside and/or an outside of the windows of the hood. A pressure relief assembly can be attached to a top of the hood structure. The pressure relief assembly can include a needle valve, a pressure relief valve, and a pressure gauge.

In various embodiments, as pass-through structure can be attached to a sidewall of the welding chamber. The pass-through structure can have an exterior door and an interior door that opens into the body structure of the welding chamber through a sidewall. The interior door can have a magnetic closure.

In various embodiments, a manifold assembly can be below a perforated plate in the body structure. The perforated plate can be substantially parallel to the bottom of the body structure, and can be near a bottom of the welding chamber. The manifold assembly can have a main branch and secondary branches. Each of the secondary branches can be perforated. In some cases, the perforations can be aligned along a side of the secondary branch and can face the bottom of the body structure to break turbulence and promote a laminar flow and displacement. In other cases, the perforations can face another direction such as upward or to the side, or the perforations can be all around the secondary branches.

In the various embodiments, the cross sectional area of the main branch can be greater than the cross sectional area of one of the secondary branches. For example, the cross sectional area of the secondary branch can be approximately half of the cross sectional area of the main branch. In some cases, the branches can be substantially tubular along their length.

In the various embodiments, a source of argon or another inter gas can be connected to the manifold assembly. The manifold assembly and the perforated plate can facilitate a displacement of oxygen or existing gas within the welding chamber and minimize dispersion and mixing by introducing the argon near the bottom of the chamber while the oxygen or existing gas is expelled from the pressure relief assembly near the top of the chamber. An oxygen sensor can determine an oxygen level within the welding chamber.

In some embodiments a control system can use the oxygen sensor reading to control a flow of the argon into the chamber, for example, causing the flow to increase or start when the oxygen in the chamber reaches a threshold amount or level that is too high or above the threshold. The threshold can be in parts per million or another measure of oxygen in the chamber. Likewise, the control system can decrease or stop the flow when the oxygen in the chamber reaches a threshold amount or level that is below a threshold.

In some embodiments, the control system can also control flow of expelled gas out of the chamber by controlling components of the pressure relief assembly in response to the oxygen levels detected or determined in the chamber. For example, the control system can adjust the needle valve to allow or increase flow of expelled gas when argon flow is increased or started, or in response to a threshold. The control system can also adjust the needle valve to stop or decrease flow of expelled gas when flow or argon is decreased or stopped, or in response to a threshold. The control system can also adjust the pressure relief valve to allow or increase flow of expelled gas when argon flow is increased or started, or in response to a threshold. The control system can also adjust the pressure relief valve to stop or decrease flow of expelled gas when flow or argon is decreased or stopped, or in response to a threshold. For example, the control system can increase or decrease the pressure of the pressure relief valve. The control system can also increase a flow of argon into the chamber in response to pressure detected by a pressure gauge being below a threshold pressure, or the control system can decrease a flow of argon or adjust the pressure relief valve in response to pressure detected by a pressure gauge being above a threshold pressure.

In the various embodiments, the pass-through structure can include a manifold assembly below a perforated plate that is in the pass-through structure and a pressure relief assembly that is attached to a top of the pass-through structure. These can be different manifold assembly and perforated plate than those in the body structure.

In the various embodiments, the welding chamber can include a gasket between a bottom of the hood structure and a top of the plurality of sidewalls. In the various embodiments, the pass-through structure can include a movable platform and a linear actuator or other motor system, such as a belt drive or another motorized system that extends the movable platform into the body structure. In the various embodiments, the pass-through structure can include a linear actuator that opens the interior door. In some cases, two or more linear actuators in a linear actuator assembly can also be attached to the interior door. Alternatively or additionally, the door can be spring-loaded to close when the linear actuator is retracted. Completely manual systems can also be used, such as gear systems, pulley systems, or pivot systems.

Also, the hinge assembly can include a first elongated member, and a first end of the first elongated member can have an elongated slot along less than a total length of the first elongated member. A first pin can extend through the elongated slot, a first end of a second elongated member, and a base bracket attached to the body structure. A second pin can extend through a second end of the first elongated member and a hood bracket attached to the hood structure. A third pin can extend through a second end of the second elongated member and the hood bracket. In the various embodiments, the hood bracket can have a curved portion that provides a contact point against the base bracket as the hood structure is opened.

Among the various embodiments can be an apparatus that includes a welding chamber body. A glove tube can be attached to a sidewall of the welding chamber body. This can provide an opening for a glove into the welding chamber body through the sidewall. Multiple such glove openings can be included.

Among the various embodiments, a hood structure can be attached to the welding chamber body using a hinge assembly. The hood structure can have a plurality of windows. A pressure relief assembly can be attached to a top of the hood structure. A manifold assembly can be below a perforated plate, and the manifold assembly can have a main branch and can have secondary branches. The main branch and/or the secondary branches can be perforated. A cross sectional area of the main branch can be greater than a cross sectional area of one or each of the secondary branches. For example, the cross sectional area of the secondary branch can be approximately half of the cross sectional area of the main branch. The branches can be substantially tubular and can be closed at ends of the otherwise tubular shape.

Among the various embodiments, a source of argon or another inert gas can be connected to the manifold assembly. The manifold assembly and the perforated plate can facilitate a displacement of oxygen within the welding chamber by introducing the argon and the oxygen or existing case can be expelled from the pressure relief assembly.

In some cases, the pass-through can be opened to outside atmosphere and a part or other object can be loaded or placed into the pass-through. The outside door of the pass-through can be sealed. A valve that introduces argon into the pass-through can opened, for example, the manifold assembly of the welding chamber can extend into the pass-through and a valve can be opened that leads to the manifold of the welding chamber. In other cases, the pass-through can have its own manifold separate from the welding chamber manifold, and a valve to a source of argon can be opened. With or without a gauge or oxygen meter, once the pass through is full of argon, the inner door can be opened. In some embodiments, a slide or movable platform can be used to extend the part into the welding chamber. The part can be welded while on the platform or can be moved and taken for work and welding to take place.

Among the embodiments, a gasket can be between a bottom edge of the hood structure and a top edge of the welding chamber body, and can be in a channel that is along either the bottom edge of the hood structure or the top edge of the welding chamber body.

Moving now to the figures, FIG. 1A shows a perspective view of an example of a displacement welding chamber 103. The displacement welding chamber 103 can have a welding chamber body or body structure 106, a hood structure 109 attached to the body structure 106 using one or more hinge assembly 112, a double pass-through structure 115, and a pass-through structure 118. The double pass-through structure 115 can also be considered two discrete pass-through structures 115. Gas springs 121 can be attached to the hood 109 and the welding chamber body 106 to limit the opening of the hood 109, holding the chamber open and assisting with its opening.

In some cases, a degree of opening of the hood 109 can be dictated or determined in consideration of a weight of the hood 109. If the hood 109 is heavy, it cannot be opened much past vertical or 90 degrees without tipping. In various embodiments, the hood 109 can be a relatively light weight hood, and can be opened widely, in some cases up to 90 degrees or more without tipping. The wide opening can allow large work pieces or objects to be inserted into the welding chamber 103, including those that cannot fit through a pass-through if present.

The welding chamber body 106 can have a number of sidewalls and a bottom. In the example shown, the welding chamber body 106 is substantially a rectangular prism shape and has four sidewalls. In other embodiments, the welding chamber body 106 can have more or fewer sidewalls and can be substantially a triangular prism pentagonal prism, hexagonal prism, circular prism, or other shapes. In the embodiment shown, the sidewalls can be substantially vertical and can be orthogonal to the bottom. Alternatively, the sidewalls can make an obtuse or acute angle with the bottom and can nevertheless have any number of sidewalls as discussed.

The welding chamber body 106 can have a number of latching devices or latches 127. The latches 127 can be located along the top edge of the sidewalls, and can engage a corresponding flange or protrusion, which can be considered part of the latches 127 that are along a bottom edge of the hood 109. The hinge assembly 112, which will be discussed in greater detail, can be a design that allows the latches 127 to securely hold down or clamp down the hood 109 to the welding chamber body 106 along all sides of the welding chamber body 106, including the side on which the hinge assembly is located. For example, the hinge assembly 112 can allow for some vertical play or vertical motion of the hood 109 along the hinged edge with respect to the welding chamber body 106, even when the hood 109 is in a closed position.

A gasket between the mated edges of the hood 109 and the welding chamber body 106 can help to seal the structure when closed. Such a gasket can be along either the bottom edge of the hood 109 and/or the top edge of the welding chamber body 106. In some cases, the gasket can be in a channel located on either edge. In other embodiments, a seal between the edges can be aided by a coating of a material such as silicone or another coating material along one or both of the edges.

The welding chamber body 106 can have a number of glove tubes 130. In the embodiment shown, the welding chamber body 106 can have four glove tubes 130 on a single sidewall. In other embodiments, more or fewer glove tubes 130 can be on a single sidewall. Other sidewalls can also have additional glove tubes 130. The glove tubes 130 can provide access to the interior of the welding chamber body 106 through corresponding glove holes through the sidewall. Gloves can be double-clamped to provide a sealed or isolated environment within the welding chamber. For example, an inside-out glove can be slipped around a glove tube 130 and clamped with a ring-shaped clamp. The glove can then be pushed into the welding chamber body 106 and clamped to the glove tube 130 again with another ring-shaped clamp. In some embodiments, the glove tubes 106 can be spaced to accommodate human arms. In some cases, spacing between glove tubes 106 and/or glove holes can be about 15 inches to 22 inches from center to center. In other cases, other spacing can be used.

The hood structure or hood 109 can open, providing access to the interior of the welding chamber body 106 when opened. This can allow parts, as well as welding and other equipment, to be accessed and placed into or removed from the welding chamber. The hood 109 can also close, providing a sealed environment that can isolate the interior of the welding chamber, between the welding chamber body 106 and the hood 109, from its exterior when closed. Windows attached to the hood structure provide for viewing of the interior while maintaining an isolated environment. Further aspects of the body 106 and the hood 109 will be discussed in greater detail below.

While not visible in FIG. 1A, the hood structure can have a manifold assembly that distributes argon or another gas into the welding chamber. The manifold assembly can be below a perforated plate that helps to more evenly and deliberately introduce the argon into the welding chamber when closed. A source of argon or another inter gas can be connected to the manifold assembly, for example, through a port or connector that penetrates a sidewall or a bottom of the welding chamber body. The manifold assembly and the perforated plate can facilitate a displacement of oxygen or existing gas within the welding chamber and minimize dispersion and mixing by introducing the argon near the bottom of the chamber while the oxygen or existing gas is expelled from a pressure relief assembly (not shown) near the top of the chamber and at the top of the hood. An oxygen sensor can determine an oxygen level within the welding chamber.

The welding chamber body 106 can also include a number of feet attached to a bottom of the welding chamber body. The feet can be any length and can be provided to allow the welding chamber to be an appropriate height for a user or welder when the chamber is on a floor, or the feet can be shorter for placement of the welding chamber on a table or another structure. In some cases, the feet can include additional cross members or other members attached for stability and can have protective materials attached at the bottom in some cases. The pass-through structures 115 and 118 can also have similar feet. The welding chamber body 106 can also have a number of handles that can, for example, allow the welding chamber to be picked up and moved. The hood 109 can also have handles, which can be used for example when opening or closing the hood 109. The welding chamber body 106 can also include a dinse or another type of socket, plug, cable, or another apparatus that allows for cabling to the welding torch inside the welding chamber body 106. Dinse connectors can be used for the wall connection and placed on the welding chamber body 106. A welding cable can be attached to a lug nut in the interior. A nose type gasket can enclose the lug nut to protect the operator and the cable.

Figure 1B:
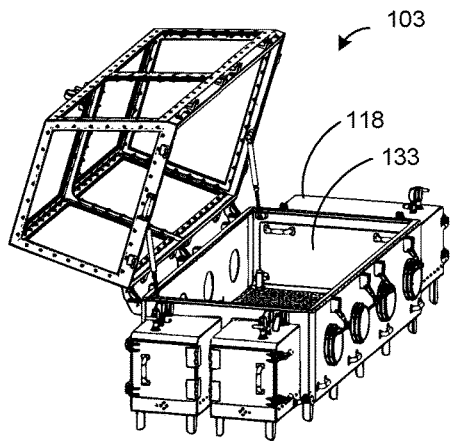

FIG. 1B shows another perspective view of the displacement welding chamber 103. This additional view provides clarity with respect to the elements and features discussed above. In addition, in this view, an interior door 133 of the pass-through structure 118 can be seen. The interior door 133 can provide a sealed and isolated environment in the welding chamber when the interior door 133 and the hood 109 are closed. To this end, in some embodiments, a gasket or a coating on the interior door and/or the interior wall of the welding chamber body 106 can help to maintain a seal when the interior door 133 is closed.

Figure 1C:
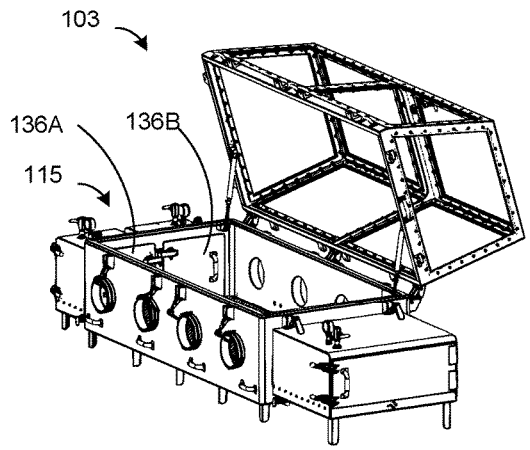

FIG. 1C shows another perspective view of the displacement welding chamber 103. This additional view provides clarity with respect to the elements and features discussed above. In this view, interior doors 136 of the pass-through structure 115 can be seen. There can be two interior doors 136, as shown. The interior doors 136A and 136B can provide a sealed and isolated environment in the welding chamber when the interior doors 136A-136B and the hood 109 are closed. To this end, in some embodiments, a gasket or a coating on the interior door and/or the interior wall of the welding chamber body 106 can help to maintain a seal when the interior doors 136A and 136B are closed.

Figure 2A:
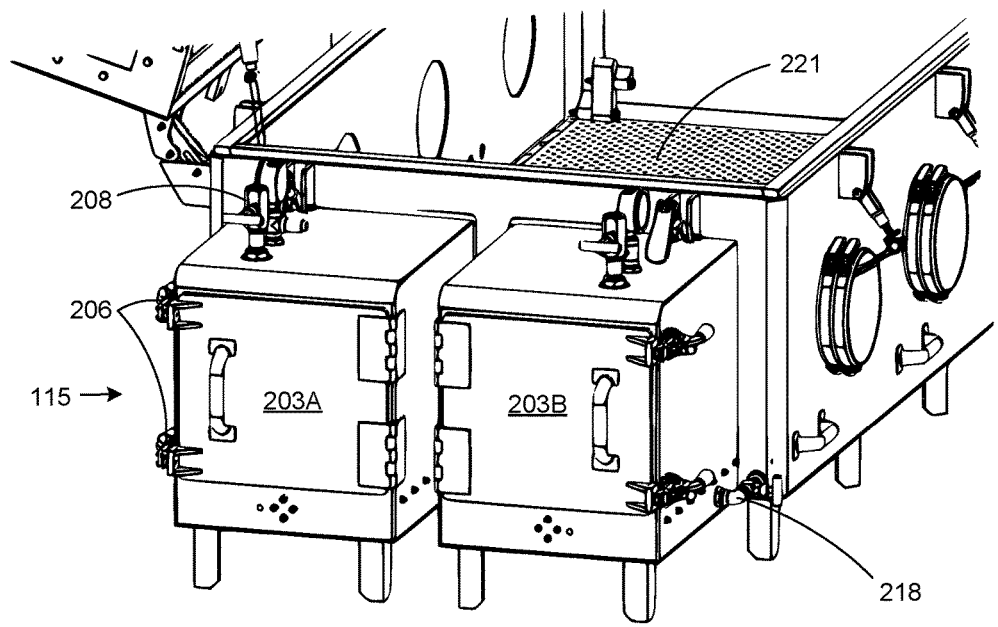
FIGS. 2A-2B illustrate magnified views of two pass-through structures of the displacement welding chamber of FIG. 1A according to an embodiment.

FIG. 2A shows a magnified perspective view of the pass-through structures 115 of FIG. 1A. The pass-through structures 115 can allow items to be introduced into the welding chamber while minimizing or eliminating introduction of oxygen or outside air into the welding chamber once the welding chamber is filled with primarily argon. The pass-through structures 115 can have exterior doors 203A and 203B. The exterior doors can be held closed using latches or clamps 206. Magnets or magnet closures can also be used additionally or alternatively. In some cases, corresponding permanent magnets can be located on the exterior door(s) and the pass-through structure(s) 115. In other cases, the magnets can be on one or the other, and can attract a ferrous material, including part of the exterior door(s) and/or part of the pass-through structure(s) 115. Other magnets or magnet closures for the various doors discussed herein can be similarly designed. A gasket or coating can be used on the exterior doors 203 and/or the pass-through structure(s) 115 to help maintain a sealed environment. Any of the magnets or magnetic closures discussed herein can include permanent neodymium magnets or magnets of any ferromagnetic material. Electromagnets can also be used.

The pass-through structures 115 can have a manifold assembly inside (not shown) that distributes argon or another gas into the welding chamber. The manifold assembly can be below a perforated plate that helps to more evenly and deliberately introduce the argon into the welding chamber when closed. In some cases, the perforated plate can be a movable platform that can extend into the welding chamber, and in other cases, the perforated plate can be below such a movable platform. The movable platform can also be motorized, for example, using a linear actuator.

A source of argon or another inter gas can be connected to the manifold assembly in the pass-through structure(s) 115, for example, through a port or connector that penetrates the pass-through structure(s) 115. The manifold assembly and the perforated plate can facilitate a displacement of oxygen or existing gas within the pass-through structure and minimize dispersion and mixing by introducing the argon near the bottom of the pass-through structure(s) 115 while the oxygen or existing gas is expelled from a pressure relief assembly 208 near the top of the pass-through structure(s) 115. An oxygen sensor can determine an oxygen level within one or each of the pass-through structure(s) 115. The pressure relief assembly 208 can include a needle valve, a pressure relief valve, and a pressure gauge. In some cases, the needle valve can be opened at the start of the purge process, to expel existing gas more rapidly. Later, the needle valve can be closed and gas can be expelled from the pressure relief valve. The pressure relief valve can be set to maintain a positive pressure in the chamber.

Once the inside of the pass-through structure(s) 115 are filled with argon and the oxygen is at an appropriate or acceptable level, then the interior door(s) 136 of the pass-through structure(s) 115 can be opened without disturbing the relatively argon-filled and relatively oxygen free environment inside the welding chamber.

In this view, we can also see a pass-through valve 218. In some embodiments, no pass-through valve 218 is used and another connection of a source of argon to a manifold inside the pass-through structure(s) 115 can be used. In some cases, the pass-through structure 115 does not have a manifold or a perforated plate, but argon gas can nevertheless be introduced through the pass-through valve 218 into the pass-through structure(s) 115, and oxygen or existing gas can be removed. In some cases, pass-through valves 218 can be additionally or alternatively located on other sides or a bottom of the pass-through structure(s) 115. In some cases, a pass-through valve(s) 218 can be connected to the manifold of the welding chamber body 106. In other embodiments, a pass-through valve(s) 218 can instead be connected directly to a source of argon.

A perforated plate 221 for the welding chamber body 106 can also be used. A manifold of the welding chamber body 106, as discussed above for FIG. 1A, can be located below the perforated plate 221. A perforated plate in a pass through structure or in a welding chamber can be designed to be rigid and withstand large and heavy objects including vices or other heavy fixtures. In some cases the perforated plate can be ¼" thick metal such as steel, stainless steel, iron, or other appropriate metal. In other cases, other the perforated plate can be made thicker or thinner, and can includes other materials such as plastic, glass, acrylic, or other material.

Figure 2B:
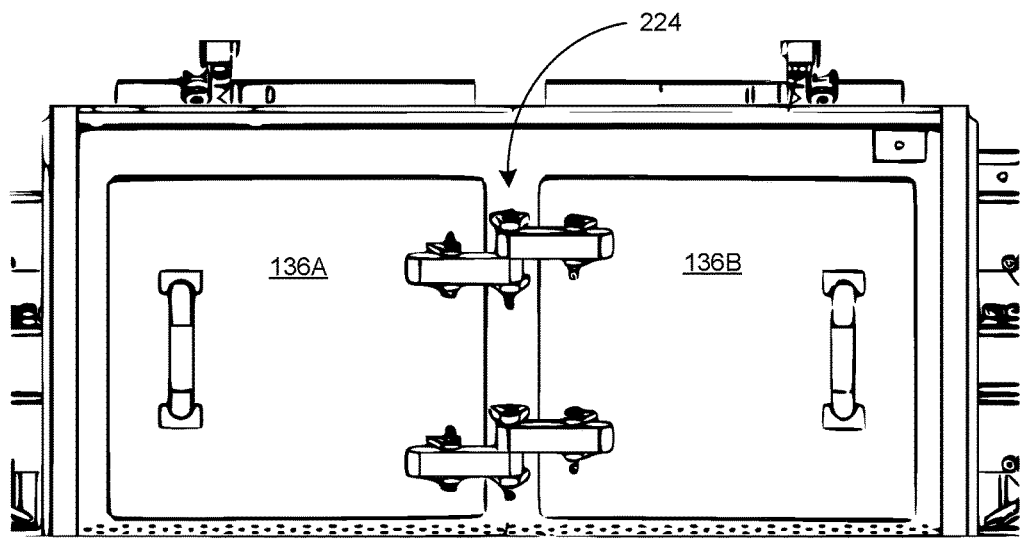

FIG. 2B shows a magnified view of the pass-through structures 115 of FIG. 1A, as from an interior of the welding chamber body 106. In this view, the interior doors 136A and 136B can be seen more clearly. The interior doors 136A and 136B can provide a sealed and isolated environment in the welding chamber when the interior doors 136A and 136B and the hood 109 are closed. To this end, in some embodiments, a gasket or a coating on the interior door and/or the interior wall of the welding chamber body 106 can help to maintain a seal when the interior doors 136A and 136B are closed. The interior doors 136A and 136B can also have a shared-knuckle hinge 221. Such a shared-knuckle hinged 221 can save space on the sidewall of the interior of the welding chamber body 106. In other embodiments, other hinges, such as individual or separate hinges can be used.

Figure 3A:
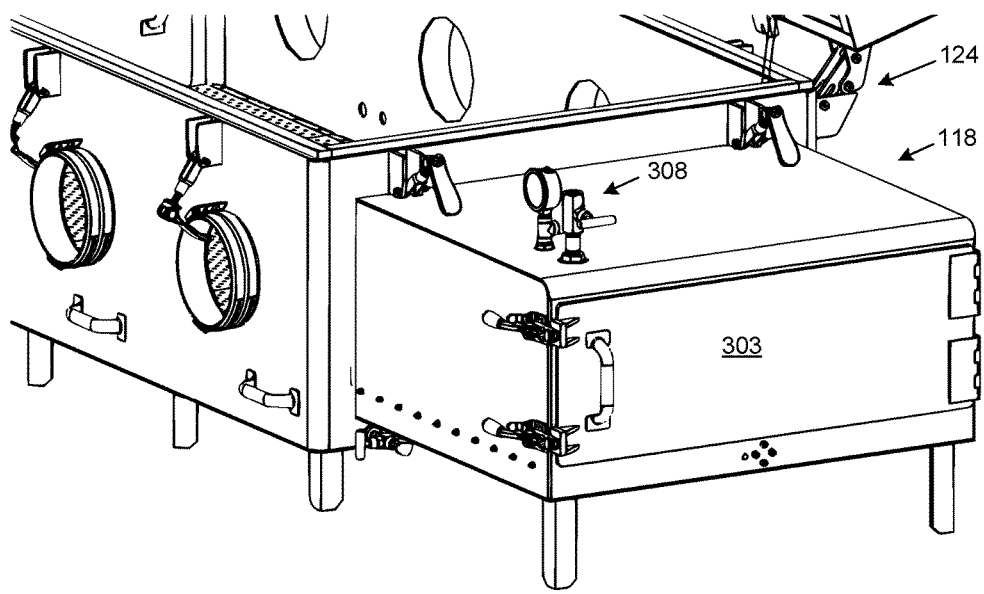
FIGS. 3A-3B illustrate magnified views another pass-through structure of the displacement welding chamber of FIG. 1A according to an embodiment.

FIG. 3A shows a magnified perspective view of the pass-through structure 118 of FIG. 1A. The pass-through structure 118 can allow items to be introduced into the welding chamber while minimizing or eliminating introduction of oxygen or outside air into the welding chamber once the welding chamber is filled with primarily argon. The pass-through structure 118 can have an exterior door 303. The exterior door 303 can be held closed using latches or clamps 206. A gasket or coating can be used on the exterior door 303 and/or the pass-through structure 118 to help maintain a sealed environment.

The pass-through structure 118 can have a manifold assembly inside (not shown) that distributes argon or another gas into the welding chamber. The manifold assembly can be below a perforated plate that helps to more evenly and deliberately introduce the argon into the welding chamber when closed. In some cases, the perforated plate can be a movable platform that can extend into the welding chamber, and in other cases, the perforated plate can be below such a movable platform. The movable platform can also be motorized, for example, using a linear actuator.

A source of argon or another inter gas can be connected to the manifold assembly in the pass-through structure 118, for example, through a port or connector that penetrates the pass-through structure 118. The manifold assembly and the perforated plate can facilitate a displacement of oxygen or existing gas within the pass-through structure 118 and minimize dispersion and mixing by introducing the argon near the bottom of the pass-through structure 118 while the oxygen or existing gas is expelled from a pressure relief assembly 308 near the top of the pass-through structure 118. An oxygen sensor can determine an oxygen level within the pass-through structure 118.

Once the inside of the pass-through structure 118 is filled with argon and the oxygen is at an appropriate or acceptable level, then the interior door 133 of the pass-through structure 118 can be opened without disturbing the relatively argon-filled and relatively oxygen-free environment inside the welding chamber.

Figure 3B:
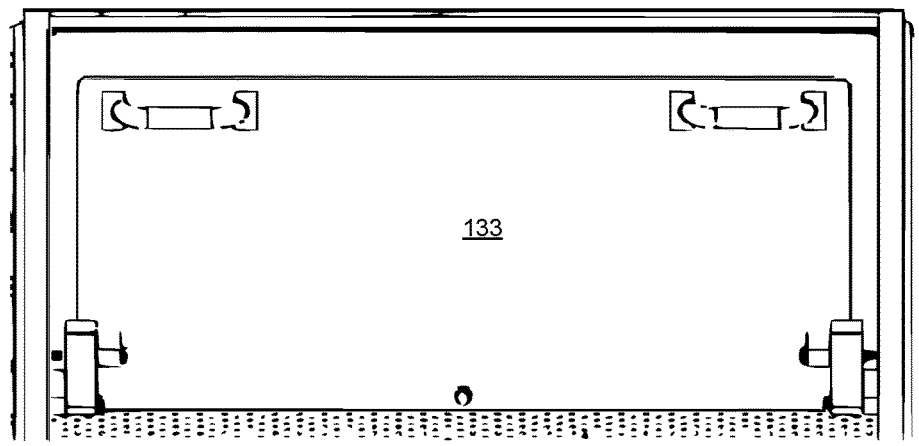

FIG. 3B shows a magnified view of the pass-through structure 118 of FIG. 1A, as from an interior of the welding chamber body 106. In this view, the interior door 133 can be seen more clearly. The interior door 133 can provide a sealed and isolated environment in the welding chamber when the interior door 133 and the hood 109 are closed. To this end, in some embodiments, a gasket or a coating on the interior door and/or the interior wall of the welding chamber body 106 can help to maintain a seal when the interior door 133 is closed. As with the other doors discussed herein, the interior door 133 can be closed with a magnetic closure as discussed above. Also, the interior door 133 is shown to open with a vertical motion as opposed to the horizontal motion of the interior door(s) 136 of FIG. 2B.

Figure 4A:
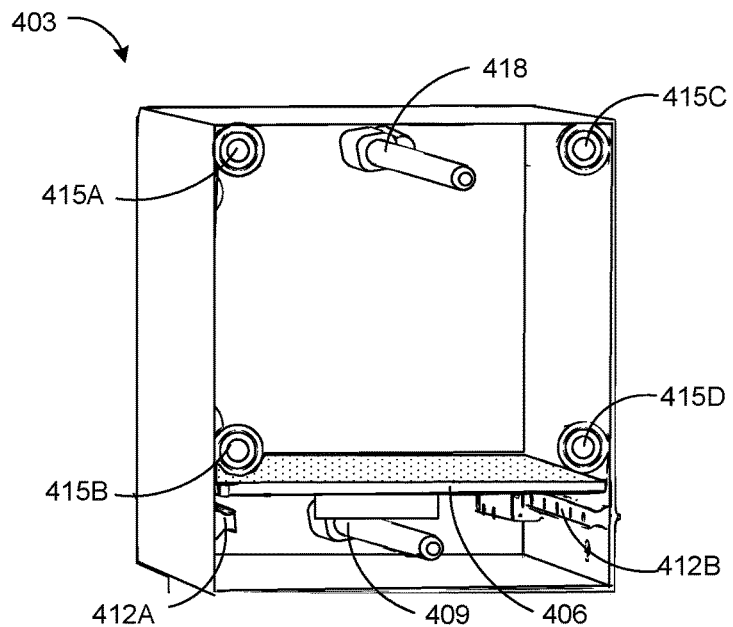
FIGS. 4A-4B illustrate perspective views of an example pass-through structure with a movable platform according to an embodiment.

FIG. 4A illustrates a perspective view of a pass-through structure 403 with a movable platform 406 when the platform is retracted or is inside the pass-through structure 403. While not shown, the pass-through structure 403 can include the elements discussed for other pass-through structures, and can be connected to a welding chamber body 106. The movable platform 406 is shown to be perforated. This can help to deliberately or controllably introduce argon gas into the rest of the pass-through structure 403, as argon gas is introduced into the pass-through structure 403 below the movable platform 403. In some cases, a manifold as discussed for other pass-through structures can further aid even distribution of argon gas. In other embodiments, the movable platform is not perforated. Among the various embodiments, a stationary perforated plate and/or a manifold as discussed can be used within the pass-through structure 403 along with the movable platform 406.

In some embodiments, a rail assembly 412A and 412B can be used to hold and slide the movable platform 406. A linear actuator assembly 409 is shown that can extend the platform into the welding chamber body 106 and retract the platform into the pass-through structure 403 along the rail assembly 412A and 412B. In other embodiments, the rail assembly can be absent, and the linear actuator assembly 409 can hold and slide the movable platform 406 without additional support.

While a single linear actuator assembly 409 is shown, multiple linear actuator assemblies 409 can be used to hold and slide the movable platform 406. In further cases, the rail assembly 412A and 412B can include a motorized portion, such as a gear or belt, that moves the movable platform 406 and can extend the platform into the welding chamber body 106 and retract the platform into the pass-through structure 403.

Figure 4B:
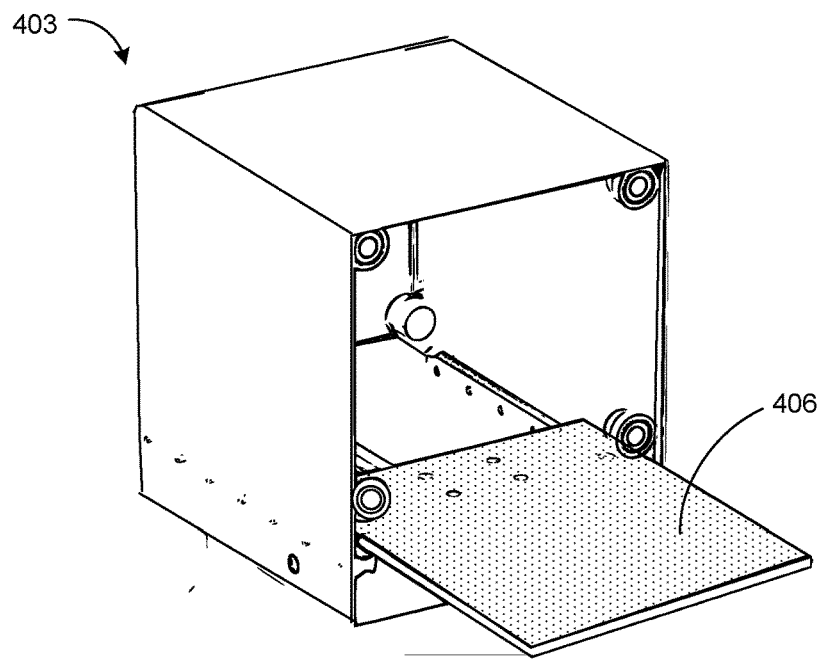

FIG. 4B shows another perspective view of the pass-through structure 403 with the movable platform 406. However, FIG. 4B shows the pass-through structure 403 with the platform 406 extended from the pass-through structure 403. In this position, the movable platform 406 can be within a welding chamber. Such a movable platform can aid the introduction of objects through the pass-through structure 403 into the welding chamber. While the system is sealed, and the hood of the welding chamber is closed, it can be difficult to reach objects inside the pass-through structure 403 from the glove holes in the welding chamber. Further, the objects can be very heavy and difficult to manipulate even if they can be reached. While the movable platform 406 is shown extended using a linear actuator, manual mechanical systems that can extend the platform 406 can also be used. Manual mechanical systems can also be used, such as gear systems, pulley systems, or pivot systems that rotate the platform 406 from a position in the pass-through structure 403 into another position in the welding chamber.

The pass-through structure 403 can also include magnetic closures 415A-D. In some cases, corresponding permanent magnets can be located on the interior door that opens into the welding chamber body 106. In other cases, the magnets can be on one or the other, and can attract a ferrous material, including part of the interior door and/or part of the pass-through structure 403 in order to hold the door closed to maintain a seal. Other magnets or magnet closures for the various doors discussed herein can be similarly designed. While four magnetic closures are shown at corners of the structure, in other embodiments another number of magnetic closures can be used, and they can be situated or arranged in another location, such as any point between the corners of the opening of the pass-through structure.

As shown, the pass-through structure 403 can also have a linear actuator 418 that can open an inner door into the welding chamber body 106. In some cases, the linear actuator or other motorized assembly that moves the platform 406 can also open an inner door into the welding chamber body 106.

Figure 5A:
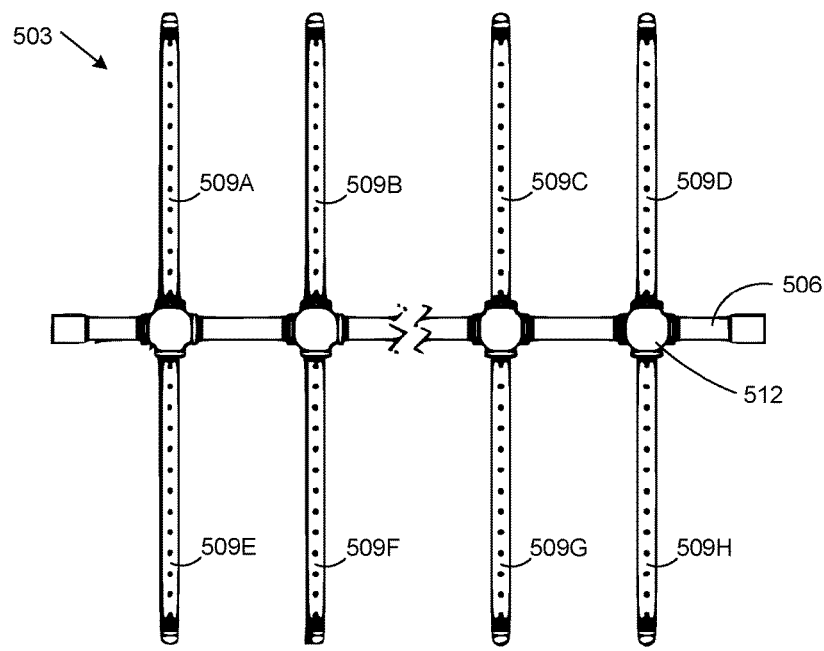
FIG. 5A illustrates an example of a manifold for a displacement welding chamber according to an embodiment.

FIG. 5A illustrates an example of a manifold assembly or a manifold 503 for a displacement welding chamber according to an embodiment. The manifold 503 can be situated near a bottom of a welding chamber, and can be under a perforated plate in the welding chamber. The manifold 503 can include a main branch 506 and secondary branches 509A-509H. While eight secondary branches are shown, additional or fewer secondary branches 509 can also be used. Each of the secondary branches 509 can be perforated to allow argon to be distributed in the welding chamber. In some embodiments, the main branch can also be perforated to allow argon to be distributed in the welding chamber. In some cases, the perforations of any branch can be aligned along a side of the branch, and can be facing the bottom of the welding chamber body 106. Downward facing perforations can prevent the flow of argon from dispersing or readily mixing with the existing gas in the welding chamber.

The downward facing perforations can cause the argon to hit the bottom of the welding chamber body 106. The incoming argon flow can eventually flow back towards to the top the welding chamber body 106 with a reduced velocity as it flows through the perforated plate. This system can form a gas blanket that slowly rises to displace the lighter oxygen. The molecular weight of argon is 40 kg/kmole. The weight of oxygen is 32 kg/kmole.

While shown in a single line, multiple lines of perforations can be included that generally face the bottom of the welding chamber body 106. In other cases, the perforations can face another direction such as upward or to the side, or the perforations can be throughout the secondary branches 509A-509H.

The main branch 506 can be substantially tubular in shape along its length. The tubular shape can be a circular tube, a square tube, or another shape that is appropriate to contain and distribute gas such as argon. For example, a circular prism could be used as a main branch with perforated secondary branches 509A-509H radially extending therefrom can also be used. The secondary branches 509A-509H can also be tubular in shape, including circular tubular shaped, square tube shaped or another shape that is appropriate to contain and distribute gas such as argon. As shown, a tee connector 512 can be used to connect the main branch 506 to the secondary branches 509.

In the various embodiments, the cross sectional area of the main branch 506 can be greater than the cross sectional area of one of the secondary branches 509. For example, the cross sectional area of the secondary branch 509 can be approximately half of the cross sectional area of the main branch 506. Where the secondary branches 509 are smaller in diameter (and cross sectional area) than the main branch 506, a reducing adapter can be used.

In the various embodiments, a source of argon or another inter gas can be connected to the manifold 503. The manifold 503 and the perforated plate can facilitate a displacement of oxygen or existing gas within the welding chamber and minimize dispersion and mixing by introducing the argon near the bottom of the chamber while the oxygen or existing gas is expelled from the pressure relief assembly near the top of the chamber. An oxygen sensor can determine an oxygen level within the welding chamber.

Other sizes and relationships than those discussed for the manifold 503 are acceptable in other embodiments as so long as the gas flowing through the manifold is relatively evenly distributed. Ii some cases (e.g., shorter embodiments such as those of 3 feet or less) argon can enter at one end of the main branch 506 of the manifold 503, with the other end stopped. On longer embodiments, argon can enter from both ends.

Figure 5B:
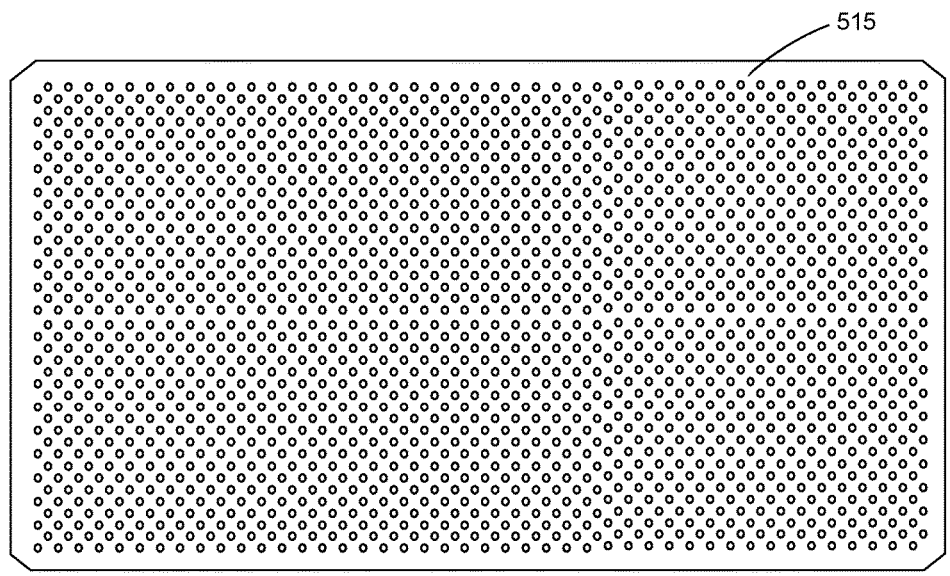
FIG. 5B illustrates an example of a perforated plate for a displacement welding chamber according to an embodiment.

FIG. 5B illustrates an example of a perforated plate 515 for a displacement welding chamber, according to an embodiment. The perforated plate 515 can have perforations that allow argon to flow slowly into the rest of the welding chamber, forming a blanket of argon that can rise and push the lighter gasses out of an opening of a pressure relief assembly at a top of the welding chamber. The perforated plate 515 can help to break turbulence and promote a laminar flow and displacement and prevent excessive dispersion of argon into the existing gas in the welding chamber. The perforations shown can be roughly circular. Other shapes can also be used, such as a series of slots, squares, or more complex shapes. The perforated plate 515 can also be a plurality of perforated plates 515 that cover a cross section of the welding chamber body. The welding chamber body can also have a ridge for the perforated plate(s) 515 to sit on, for example, on the sidewalls of the welding chamber body at a particular height or position. In some cases, a grate can be used instead of a perforated plate 515.

Figure 6A:
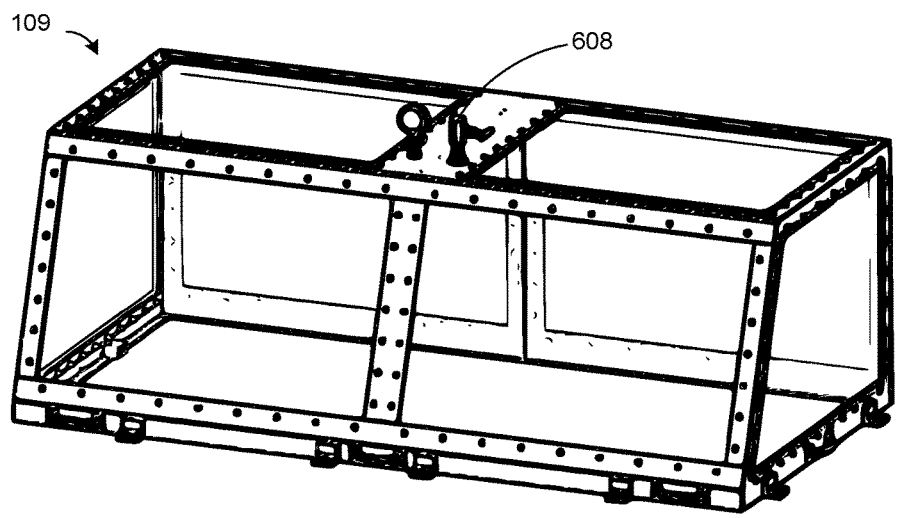
FIG. 6A illustrates a perspective view of an example of a hood of a displacement welding chamber according to an embodiment.

FIG. 6A illustrates a perspective view of an example of a hood 109 of a displacement welding chamber 103 according to an embodiment. The hood 109 can include windows that provide a seal that prevents outside gasses from entering the closed welding chamber between the hood 109 and a welding chamber body 106 as in FIG. 1. In some cases the hood includes sealing washers and the structural strength of the glass to provide the seal. In this view, the top of the hood 109 can be seen. A pressure relief assembly 608 can be attached to the top of the hood 109 that can allow gasses to escape as a blanket of argon rises as argon is introduced into the welding chamber body using the manifold and the perforated plate as discussed.

Figure 6B:
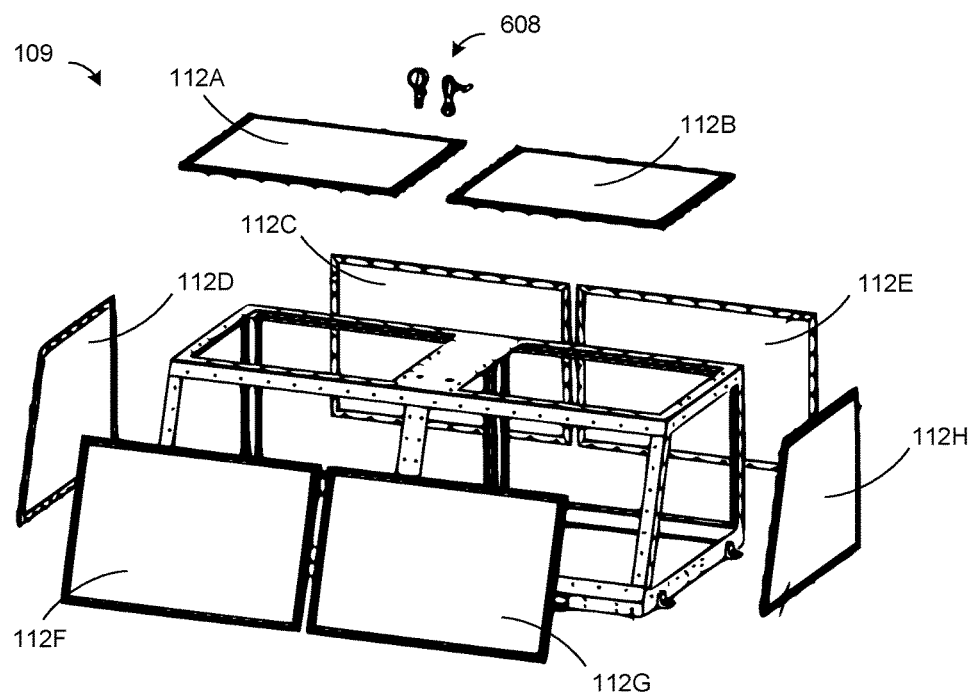
FIG. 6B illustrates an exploded view of the hood of FIG. 6A according to an embodiment.

FIG. 6B illustrates an exploded view of the hood 109 of FIG. 6A according to an embodiment. In this view, the windows 112, including windows 112A-112H can be seen more clearly. The windows 112 can include a UV protective film or a UV protective coating. In some cases, the UV protective film or coating can be on one or both sides of the windows 112. In some cases, all windows include the coating. In other cases, some windows can be clear or not have the UV protections, so as to admit ambient light. In some cases, the protective film can be absent. In other cases, the protective film can be heavy enough for welding without face shields. Interior lighting can be utilized inside the welding chamber in some cases, for example, when protective film is very dark or heavy or dark. Other methods of window protection can also be used, such as laminated glass.

The relatively lightweight hood 109 is designed to open similar to an automobile hood. In this embodiment, the hood can be made from polycarbonates, glass, or other high transmittance material in the visible range. A UV film or coating can reduce the risks of emitting high intensity UV radiation to the workplace during welding. The frame of the hood 109 can be of steel, aluminum or other satisfactory material. Gaskets and frames are manufactured to hold the windows in place, for example, using screws. In this embodiment, L-shaped brackets are part of the latches 127 discussed earlier with respect to FIG. 1A.

A needle valve at the top of the hood can control the exit flow of gas. A pressure relief valve can set for a low pressure (e.g., 5 psi) or another pressure. Together with a pressure gauge, these components of the pressure relief assembly 609 can ensure an adjustable and regulated positive pressure in the chamber, maintaining a safe and argon protected welding environment.

It should be noted that the light and convenient structure provided herein for the hood 109 can be designed such that it is inappropriate to hold a complete vacuum. In some embodiments the hood 109 can be a hood that cannot hold a vacuum. Accordingly, in some embodiments, the welding chamber body and the other components of the welding chamber do not have to hold a complete vacuum. In some embodiments the welding chamber body does not or cannot hold a vacuum. The displacement system disclosed herein allows for this structure to maintain an argon protected and relatively oxygen free environment while not requiring the pressures needed for complete evacuation systems that evacuate all or most of the gasses from the chamber. In some cases, because of the displacement system, the components of the hood of the welding chamber, as well as the other components, can be lightweight and operate properly while being unable to hold, for example, approximately 3-10 PSIG lower than the pressure of the area where the welding chamber is located.

Figure 7A:
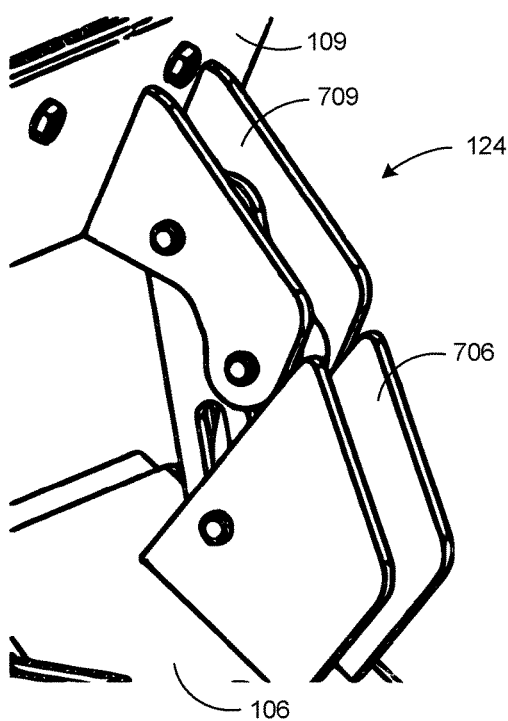
FIGS. 7A-7B illustrate example views of a hinge assembly of a displacement welding chamber according to an embodiment.

FIG. 7A shows a hinge assembly 124. The hinge assembly 124 can be attached to a base bracket 706 and a hood bracket 709. The hinge assembly 124 can be considered a slotted hinge assembly and can allow the hood 109 to be clamped or latched down using the latches 127. The base bracket 706 can be attached to the welding chamber body 106, for example, as shown in FIG. 1A. The hinge assembly 124 can be illustrative of a number of such hinge assemblies 124.

In the various embodiments, the hinge assembly can include a first elongated member, and a first end of the first elongated member can have an elongated slot along less than a total length of the first elongated member. A first pin can extend through the elongated slot, a first end of a second elongated member, and the base bracket 706 attached to the welding chamber body 106. A second pin can extend through a second end of the first elongated member and the hood bracket 709 attached to the hood 109. A third pin can extend through a second end of the second elongated member and the hood bracket 709. In the various embodiments, the hood bracket 709 can have a curved portion that provides a contact point against the base bracket as the hood structure is opened. In some cases, curved portion does not provide a contact point when the hood 109 is closed, such that the hood 109 can be clamped or latched down using the latches 127 as discussed. Each pin can act as a pivot point. Each pin can be a screw or another sort hardware that provides a pivot point through the members of the hinge 124.

Figure 7B:
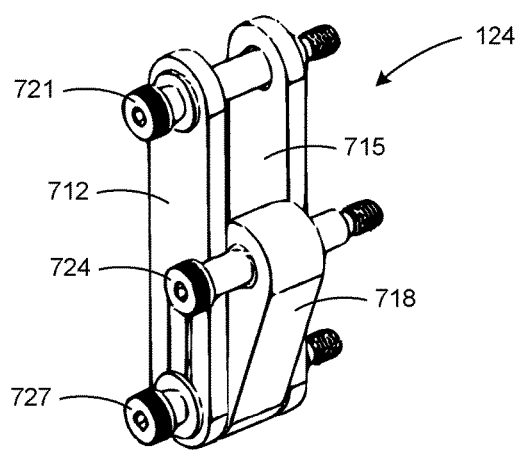

FIG. 7B shows the hinge assembly 124 separate from the other components. In some cases, the first elongated member can instead be two such elongated members, each with a slot that extends less than a total length of the other member. In some cases, the slot extends approximately half of the length of the first member. Also, where the first elongated member is two such elongated members, the second elongated member can be between them.

As shown, the hinge assembly 124 can include an elongated member 712 that can have an elongated slot along less than a total length of the elongated member 712. The hinge assembly 124 can also include an elongated member 715 that can have an elongated slot along less than a total length of the elongated member 715. A pin 721 can extend through the elongated member 712 and the elongated member 715 that is aligned with the elongated member 712, at an end of each of the elongated members 712 and 715 opposite each elongated slot. As attached in place on the welding chamber, the pin 721 can also extend through the hood bracket 709.

The hinge assembly 124 can also include an elongated member 718. A pin 724 can extend through one end of the elongated member 718 and through the hood bracket 709. A pin 727 can extend through the base bracket 706, another end of the elongated member 718, and through the elongated slot end of the elongated member 712 and the elongated member 715 that is aligned with the elongated member 712.

The hinge assembly 124 can be considered a three-point hinge to open the hood. In some cases the hinge 124 can open to about 75 degrees and it can also close. The hinge 124 does not impede the closing latches 127, and there is sufficient play for the hood to winch down with the latches 127 as discussed. Other hinges in other embodiments of the invention contain the ability to receive compression.

Figure 8A:
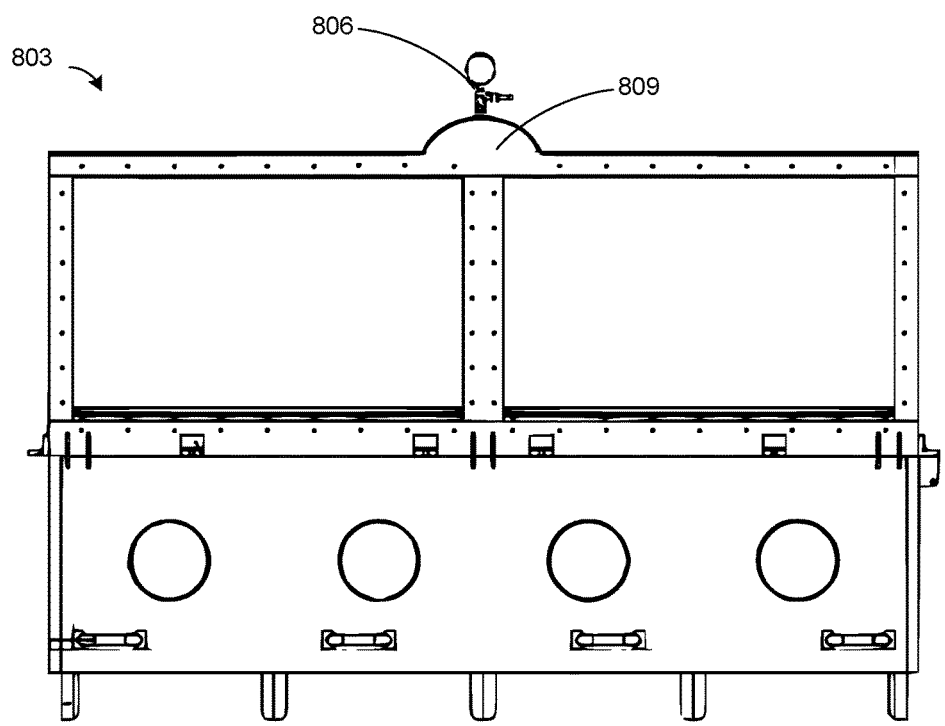
FIG. 8A illustrates an example of a front view of a displacement welding chamber according to an embodiment.

FIG. 8A shows a front view of a displacement welding chamber 803 according to an embodiment. The welding chamber 803 can have a pressure relief assembly 806 on a convex structure 809 at a top of a hood of the welding chamber 803. The convex structure 809 can be a part of a frame of the hood. In other embodiments, the convex structure 806 can be part of a window of the hood. While shown at a middle portion of the welding chamber 803, the convex structure can be located anywhere at the top of the hood of the welding chamber 803. The convex structure 809 can accumulate oxygen or lighter gasses as argon or other inert gas is input into the welding chamber 803. Accordingly, the convex structure 809 can also be called a gas accumulator or accumulating structure. In other embodiments, the convex structure 809 can instead be an angular accumulator structure rather than a curved convex structure. Since the oxygen is lighter than argon, the convex structure 809 can help minimize discharge of argon through the pressure relief assembly 806 by accumulating the lighter gasses such as oxygen near the input of the pressure relief assembly 806. The pressure relief assembly 806 can include elements similar to the other pressure relief assemblies discussed herein.

Figure 8B:
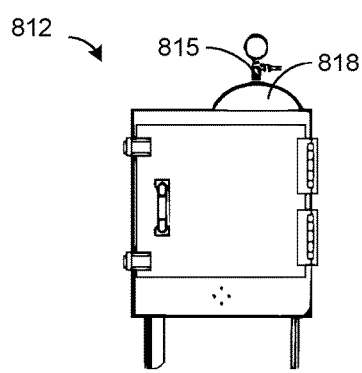
FIG. 8B illustrates an example of a front view of a pass-through of a displacement welding chamber according to an embodiment.

FIG. 8B shows a front view of a pass-through 812 according to an embodiment. The pass-through 812 can have a pressure relief assembly 815 on a convex structure 818 at a top of the pass-through 812. The convex structure 818 can be located anywhere at the top of the pass-through 812. The convex structure 818 can accumulate oxygen or lighter gasses as argon or other inert gas is input into the pass-through 812. Accordingly, the convex structure can also be called a gas accumulator or accumulating structure. In other embodiments, the convex structure 818 can instead be an angular accumulator structure rather than a curved convex structure. Since the oxygen is lighter than argon, the convex structure 818 can help minimize discharge of argon through the pressure relief assembly 815 by accumulating the lighter gasses such as oxygen near the input of the pressure relief assembly 815. The pressure relief assembly 815 can include elements similar to the other pressure relief assemblies discussed herein.

As used herein, the terms "approximate" and "approximately" can refer to values that differ about 30% more or less, about 25% more or less, about 20% more or less, about 15% more or less, about 10% more or less, or about 5% more or less than the approximate value noted.

Although embodiments have been described herein in detail, the descriptions are by way of example. The features of the embodiments described herein are representative and, in alternative embodiments, certain features and elements may be added or omitted. Additionally, modifications to aspects of the embodiments described herein may be made by those skilled in the art without departing from the spirit and scope of the present invention defined in the following claims, the scope of which are to be accorded the broadest interpretation so as to encompass modifications and equivalent structures.

Therefore, the following is claimed:

1. A welding chamber, comprising:
   a body structure having a plurality of sidewalls, a bottom, a glove tube attached to a first one of the sidewalls, and a glove hole through the glove tube and the first one of the sidewalls;
   a glove attached to the glove tube using a plurality of clamping rings;
   a hood structure that is attached to the body structure using a hinge assembly, the hood structure having a plurality of windows;
   a pressure relief assembly attached to a top of the hood structure;
   a pass-through structure attached to a second one of the sidewalls, the pass-through structure having an exterior door, an interior door that opens into the body structure through the second one of the sidewalls, the interior door having a magnetic closure;
   a manifold assembly that is below a perforated plate in the body structure substantially parallel to the bottom of the body structure, the manifold assembly having a main branch and a plurality of secondary branches, the plurality of secondary branches being perforated along one side that faces the bottom of the body structure, a first cross sectional area of the main branch being greater than a second cross sectional area of one of the plurality of secondary branches;
   a source of argon connected to the manifold assembly, wherein at least the manifold assembly and the perforated plate facilitate a displacement of oxygen within the welding chamber by introducing the argon while the oxygen is expelled from the pressure relief assembly; and
   an oxygen sensor that determines an oxygen level within the welding chamber.

2. The welding chamber of claim 1, wherein the second cross sectional area is approximately half of the first cross sectional area.

3. The welding chamber of claim 1, wherein the pass-through structure includes another manifold assembly below another perforated plate that is in the pass-through structure, and another pressure relief assembly is attached to a top of the pass-through structure.

4. The welding chamber of claim 1, further comprising a gasket between a bottom of the hood structure and a top of the plurality of sidewalls.

5. The welding chamber of claim 1, wherein the pressure relief assembly comprises a needle valve, a pressure relief valve, and a pressure gauge.

6. The welding chamber of claim 1, wherein the pass-through structure further comprises a movable platform and a linear actuator that extends the movable platform into the body structure.

7. The welding chamber of claim 1, wherein the pass-through structure further comprises a linear actuator that opens the interior door.

8. The welding chamber of claim 1, wherein an ultraviolet (UV) protective film is applied to at least one of an inside or an outside of at least one of the plurality of windows.

9. The welding chamber of claim 1, wherein the hinge assembly comprises:
a first elongated member, a first end of the first elongated member having an elongated slot along less than a length of the first elongated member;
a second elongated member;
a first pin that extends through the elongated slot, a first end of the second elongated member, and a base bracket attached to the body structure;
a second pin that extends through a second end of the first elongated member and a hood bracket attached to the hood structure; and
a third pin that extends through a second end of the second elongated member and the hood bracket.

10. The welding chamber of claim 9, wherein the hood bracket has a curved portion that provides a contact point against the base bracket as the hood structure is opened.

11. An apparatus, comprising:
a welding chamber body;
a glove tube attached to a sidewall of the welding chamber body that provides an opening for a glove into the welding chamber body through the sidewall;
a hood structure that is attached to the welding chamber body using a hinge assembly, the hood structure having a plurality of windows;
a pressure relief assembly attached to a top of the hood structure;
a manifold assembly that is below a perforated plate, the manifold assembly having a main branch and a plurality of secondary branches, the plurality of secondary branches being perforated, a first cross sectional area of the main branch being greater than a second cross sectional area of one of the plurality of secondary branches;
a source of argon connected to the manifold assembly, wherein at least the manifold assembly and the perforated plate facilitate a displacement of oxygen within the welding chamber by introducing the argon while the oxygen is expelled from the pressure relief assembly; and
a pass-through structure attached to another sidewall of the welding chamber body, the pass-through structure having an exterior door, an interior door that opens into the welding chamber body, the interior door having a magnetic closure.

12. The apparatus of claim 11, wherein the second cross sectional area is approximately half of the first cross sectional area.

13. The apparatus of claim 11, further comprising a gasket between a bottom edge of the hood structure and a top edge of the welding chamber body.

14. The apparatus of claim 11, wherein an ultraviolet (UV) protective film is applied to at least one of an inside or an outside of at least one of the plurality of windows.

15. The apparatus of claim 11, wherein the pass-through structure further comprises a movable platform.

16. The apparatus of claim 15, wherein the pass-through structure further comprises a linear actuator that extends the movable platform into the welding chamber body.

17. The apparatus of claim 15, wherein the pass-through structure further comprises a linear actuator that opens the interior door.

18. The apparatus of claim 15, wherein the pass-through structure includes another manifold assembly below another perforated plate, and another pressure relief assembly is attached to a top of the pass-through structure.

19. An apparatus, comprising:
a welding chamber body;
a glove tube attached to a sidewall of the welding chamber body that provides an opening for a glove into the welding chamber body through the sidewall; a hood structure that is attached to the welding chamber body using a hinge assembly, the hood structure having a plurality of windows, wherein the hinge assembly comprises:
a first elongated member, a first end of the first elongated member having an elongated slot along less than a length of the first elongated member;
a second elongated member;
a first pin that extends through the elongated slot, a first end of the second elongated member, and a base bracket attached to the welding chamber body;
a second pin that extends through a second end of the first elongated member and a hood bracket attached to the hood structure; and
a third pin that extends through a second end of the second elongated member and the hood bracket;
a pressure relief assembly attached to a top of the hood structure;
a manifold assembly that is below a perforated plate, the manifold assembly having a main branch and a plurality of secondary branches, the plurality of secondary branches being perforated, a first cross sectional area of the main branch being greater than a second cross sectional area of one of the plurality of secondary branches; and
a source of argon connected to the manifold assembly, wherein at least the manifold assembly and the perforated plate facilitate a displacement of oxygen within the welding chamber by introducing the argon while the oxygen is expelled from the pressure relief assembly.

20. The apparatus of claim 19, wherein the hood bracket has a curved portion that provides a contact point against the base bracket as the hood structure is opened.

* * * * *